US008974283B2

(12) United States Patent
Jaffe et al.

(10) Patent No.: US 8,974,283 B2
(45) Date of Patent: Mar. 10, 2015

(54) WAGERING GAME WITH MOVING SYMBOL ARRAYS

(71) Applicant: WMS Gaming Inc., Waukegan, IL (US)

(72) Inventors: Joel R. Jaffe, Glenview, IL (US); Collette C. Shawn, Henderson, NV (US)

(73) Assignee: WMS Gaming Inc., Waukegan, IL (US)

( * ) Notice: Subject to any disclaimer, the term of this patent is extended or adjusted under 35 U.S.C. 154(b) by 73 days.

(21) Appl. No.: 13/765,035

(22) Filed: Feb. 12, 2013

(65) Prior Publication Data

US 2013/0217465 A1 Aug. 22, 2013

Related U.S. Application Data

(60) Provisional application No. 61/600,212, filed on Feb. 17, 2012.

(51) Int. Cl.
*G06F 13/00* (2006.01)
*G07F 17/32* (2006.01)

(52) U.S. Cl.
CPC .................................. *G07F 17/3213* (2013.01)
USPC ............................................... 463/16; 463/37

(58) Field of Classification Search
USPC ...................................................... 463/16, 37
See application file for complete search history.

(56) References Cited

U.S. PATENT DOCUMENTS 5,823,873 A 10/1998 Moody
5,980,384 A 11/1999 Barrie
5,997,401 A 12/1999 Crawford
6,159,095 A 12/2000 Frohm et al.
6,203,428 B1 3/2001 Giobbi et al.
6,270,412 B1 8/2001 Crawford et al.
6,517,433 B2 2/2003 Loose et al.
6,644,664 B2 11/2003 Muir et al.
6,652,378 B2 11/2003 Cannon et al.
6,656,040 B1 12/2003 Brosnan et al.
6,755,738 B2 6/2004 Glasson et al.
6,832,957 B2 12/2004 Falconer
6,860,810 B2 3/2005 Cannon et al.
6,896,615 B2 5/2005 Berman
6,896,617 B2 5/2005 Daly
6,921,334 B1 7/2005 Bennett
6,932,700 B2 8/2005 Bennett et al.
7,108,602 B2 9/2006 Daly
7,156,735 B2 1/2007 Brosnan et al.
7,331,858 B2 * 2/2008 McComb et al. ............... 463/16
7,351,144 B2 4/2008 Daly (Continued)

FOREIGN PATENT DOCUMENTS

GB 2157047 10/1985

*Primary Examiner* — Reginald Renwick
(74) *Attorney, Agent, or Firm* — Nixon Peabody LLP

(57) ABSTRACT

A gaming system for conducting a wagering game includes an input device, a display device, a processor, and a memory device for storing instructions that cause the processor to operate the gaming system. The gaming system receives an input to play the wagering game and randomly determines a plurality of symbols to populate symbol positions in one or more symbol arrays. The gaming system displays dynamic content in the symbol positions concluding with the randomly determined symbols while the one or more symbol arrays are moved with respect to an indicator region. The gaming system displays an indication of an outcome of the wagering game determined based on any of the one or more symbol arrays appearing in the indicator region after the one or more symbol arrays are moved.

20 Claims, 7 Drawing Sheets

(56) References Cited

U.S. PATENT DOCUMENTS

| | | | | |
|---|---|---|---|---|
| 7,361,089 | B2 | 4/2008 | Daly et al. | |
| 7,513,828 | B2 | 4/2009 | Nguyen et al. | |
| 7,594,851 | B2 | 9/2009 | Falconer | |
| 7,601,061 | B2 * | 10/2009 | Jackson | 463/20 |
| 7,611,406 | B2 | 11/2009 | Fuller | |
| 7,625,280 | B2 | 12/2009 | Singer et al. | |
| 7,654,895 | B2 | 2/2010 | Pacey | |
| 7,727,069 | B1 | 6/2010 | Nelson | |
| 7,950,994 | B2 | 5/2011 | Berman et al. | |
| 8,241,124 | B2 * | 8/2012 | Kelly et al. | 463/34 |
| 2003/0087689 | A1 * | 5/2003 | Adams | 463/20 |
| 2003/0104855 | A1 * | 6/2003 | McClintic | 463/16 |
| 2004/0242313 | A1 | 12/2004 | Munoz | |
| 2005/0059478 | A1 * | 3/2005 | Peterson et al. | 463/20 |
| 2008/0220839 | A1 | 9/2008 | DeBrabander | |
| 2010/0069160 | A1 | 3/2010 | Barrett et al. | |
| 2010/0234099 | A1 | 9/2010 | Rasmussen et al. | |

* cited by examiner

WAGERING GAME WITH MOVING SYMBOL ARRAYS

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to gaming apparatus and methods and, more particularly, to methods of systems and methods for playing a wagering game where one or more symbol arrays are displayed in motion prior to evaluating the symbol array.

BACKGROUND OF THE INVENTION

Gaming terminals, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for gaming machine manufacturers to continuously develop new games and improved gaming enhancements that will attract frequent play through enhanced entertainment value to the player

SUMMARY OF THE INVENTION

In order to increase player entertainment while playing a wagering game, wagering game terminals are described which portray wagering game outcomes via symbol arrays that move through a primary display area of a gaming terminal while symbols move through symbol positions in the symbol array. Thus, symbols within each symbol array are co-moving (within their respective symbol positions) while the symbol arrays themselves also move through the display area of the gaming terminal. The movement of both is eventually stopped and the wagering game outcome is indicated by one of the symbol arrays that stops within an indicator region of the display area. Once stopped in the indicator region, the selected symbol array is evaluated according to one or more paylines to indicate the outcome. From a player's perspective, the indicator region is a region of the primary display area in which symbol arrays are evaluated to determine an outcome.

Player anticipation of a particular outcome can be further influenced by varying the relative speeds of the symbol arrays and the symbols moving through each symbol position to allow the symbols to conclude movement prior to stopping the symbol arrays or, vice versa. Other features can be modified and/or activated based on game outcomes, bonus events, community events, etc., such as changes in the movement of the symbol arrays, changes in the dimension of the symbol arrays and/or indicator region, etc. In some instances, the symbol arrays can be displayed via a video display included in a display area of a gaming terminal and the motion of the symbol arrays (and the symbols within the symbol positions) can be achieved by displaying suitable video content on the video display.

Thus, some examples of the present disclosure disclose a gaming terminal for playing a wagering game. The gaming terminal can include a video display displaying video content indicative of a rotatable wheel and an indicator region, or can include a rotatable wheel mounted in the gaming terminal. The rotatable wheel can have a plurality of symbol arrays situated thereon. Each of the symbol arrays can include at least one video display for displaying a plurality of symbols. The indicator region can be adjacent to the rotatable wheel for identifying one of the plurality of symbol arrays that includes symbols indicating an outcome of the wagering game. The indicator region can move relative to the plurality of symbol arrays while symbols in the plurality of symbol arrays are dynamically displayed. The present disclosure provides for displaying an outcome of a wagering game by displaying a plurality of distinct, separated arrays that, on the one hand, have their own multiple rotating reels, and, on the other hand, move with an underlying virtual substrate by displaying the separated arrays as fixed to the underlying virtual substrate. The arrays are moved with respect to an indicator region and one of the arrays is stopped in the indicator region to identify the stopped array as the array indicating the game outcome ("the game outcome array").

Other examples disclose a gaming system including at least one input device, at least one display device, at least one processor, and at least one memory device. The memory device can store instructions that, when executed by the processor, cause the gaming system to operate. In operation, the gaming system receives an input to play a wagering game via the at least one input device. The gaming system portrays a plurality of separated symbol arrays in motion with respect to an indicator region. Each of the plurality of symbol arrays having a plurality of symbol positions. While portraying the movement of the plurality of symbol arrays, the gaming system displays, via the at least one display device, dynamic content in the symbol positions of each of the plurality of symbol arrays. The dynamic content includes a plurality of symbols for indicating an outcome of the respective symbol array. The gaming system stops the movement of at least one of the plurality of symbol arrays with respect to the indicator region such that one of the plurality of symbol arrays is associated with the indicator region to indicate an outcome of the wagering game.

Other examples disclose a computer-implemented method of operating a gaming system. The method includes receiving, via an input device, an input to play a wagering game. The method includes displaying, via one or more display devices, dynamic content in a plurality of symbol positions of each of a plurality of separated symbol arrays. The dynamic content includes a plurality of symbols that move through the plurality of symbol positions of the respective symbol array. The method also includes portraying the plurality of symbol arrays in motion with respect to an indicator region while displaying the dynamic content in the plurality of symbol positions of the respective symbol array. The method also includes stopping the movement of one of the plurality of symbol arrays with respect to the indicator region to thereby indicate an outcome of the wagering game.

According to yet another aspect of the invention, computer readable storage media is encoded with instructions for directing a gaming system to perform the above method.

Additional aspects of the invention will be apparent to those of ordinary skill in the art in view of the detailed description of various embodiments, which is made with reference to the drawings, a brief description of which is provided below.

Figure 1:
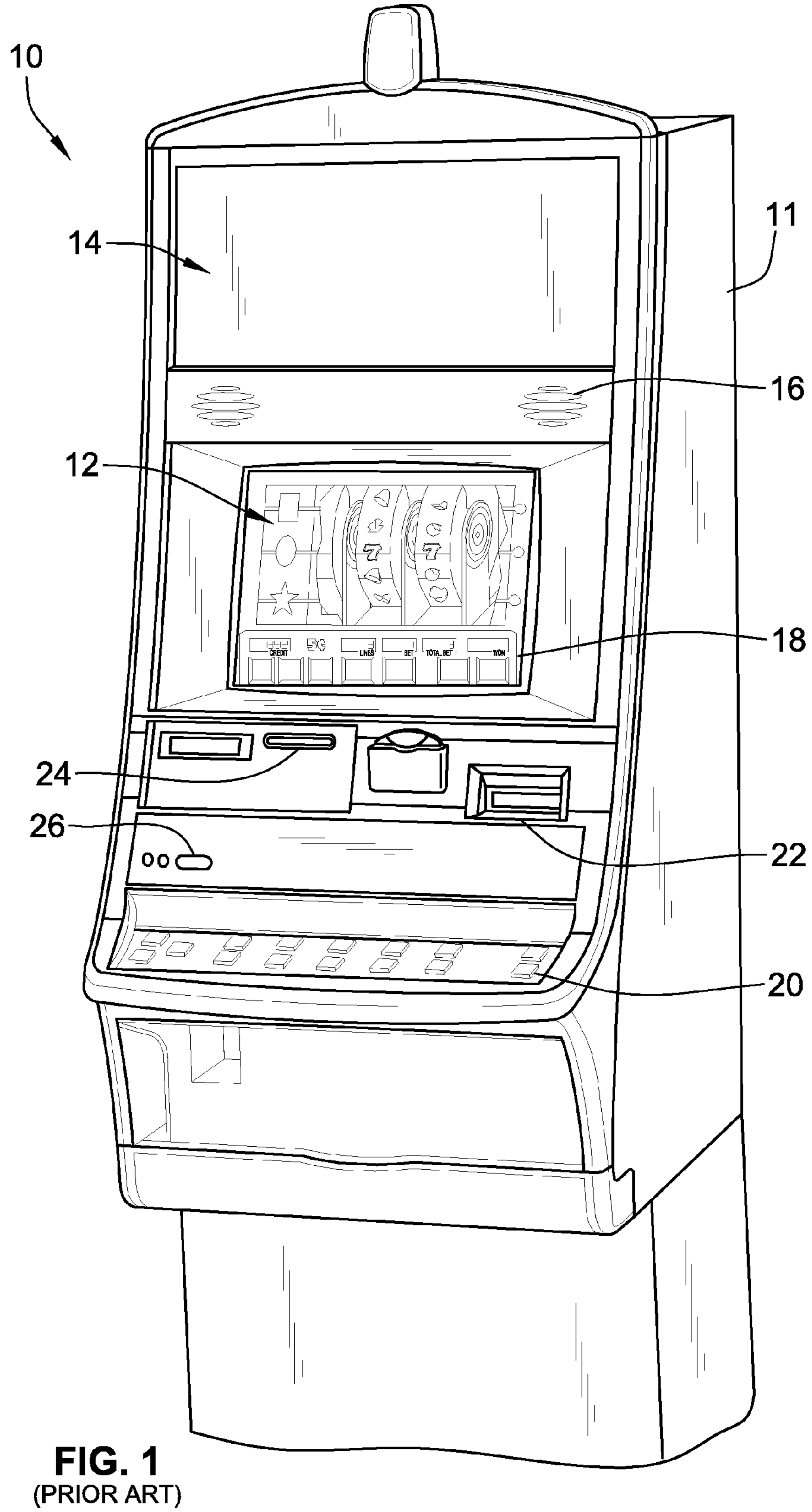
FIG. 1 (PRIOR ART)
FIG. 1 is a perspective view of a free-standing gaming terminal according to an embodiment of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

Referring to FIG. 1, there is shown a gaming terminal 10 similar to those used in gaming establishments, such as casinos. With regard to the present invention, the gaming terminal 10 may be any type of gaming terminal and may have varying structures and methods of operation. For example, in some aspects, the gaming terminal 10 is an electromechanical gaming terminal configured to play mechanical slots, whereas in other aspects, the gaming terminal is an electronic gaming terminal configured to play a video casino game, such as slots, keno, poker, blackjack, roulette, craps, etc. The gaming terminal 10 may take any suitable form, such as floor-standing models as shown, handheld mobile units, bartop models, workstation-type console models, etc. Further, the gaming terminal 10 may be primarily dedicated for use in conducting wagering games, or may include non-dedicated devices, such as mobile phones, personal digital assistants, personal computers, etc. Exemplary types of gaming terminals are disclosed in U.S. Pat. No. 6,517,433 and Patent Application Publication Nos. US2010/0069160 and US2010/0234099, which are incorporated herein by reference in their entireties.

The gaming terminal 10 illustrated in FIG. 1 comprises a cabinet 11 that may house various input devices, output devices, and input/output devices. By way of example, the gaming terminal 10 includes a primary display area 12, a secondary display area 14, and one or more audio speakers 16. The primary display area 12 or the secondary display area 14 may be a mechanical-reel display, a video display, or a combination thereof in which a transmissive video display is disposed in front of the mechanical-reel display to portray a video image superimposed upon the mechanical-reel display. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming terminal 10. The gaming terminal 10 includes a touch screen(s) 18 mounted over the primary or secondary areas, buttons 20 on a button panel, bill validator 22, information reader/writer(s) 24, and player-accessible port(s) 26 (e.g., audio output jack for headphones, video headset jack, USB port, wireless transmitter/receiver, etc.). It should be understood that numerous other peripheral devices and other elements exist and are readily utilizable in any number of combinations to create various forms of a gaming terminal in accord with the present concepts.

Input devices, such as the touch screen 18, buttons 20, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Figure 2:
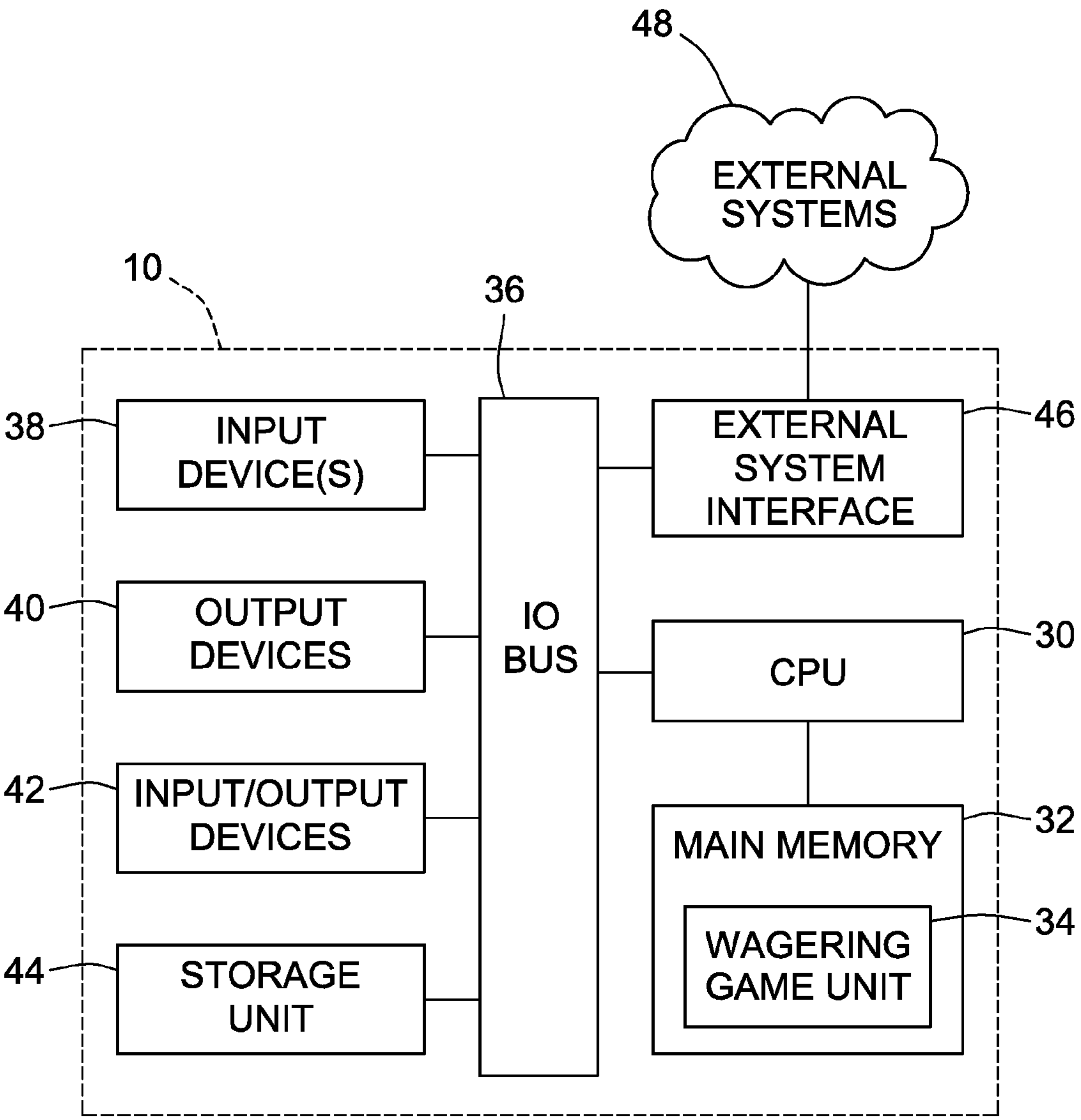
FIG. 2 (PRIOR ART)
FIG. 2 is a schematic view of a gaming system according to an embodiment of the present disclosure.

Turning now to FIG. 2, there is shown a block diagram of the gaming-terminal architecture. The gaming terminal 10 includes a central processing unit (CPU) 30 connected to a main memory 32. The CPU 30 may include any suitable processor(s), such as those made by Intel and AMD. By way of example, the CPU 30 includes a plurality of microprocessors including a master processor, a slave processor, and a secondary or parallel processor. CPU 30, as used herein, comprises any combination of hardware, software, or firmware disposed in or outside of the gaming terminal 10 that is configured to communicate with or control the transfer of data between the gaming terminal 10 and a bus, another computer, processor, device, service, or network. The CPU 30 comprises one or more controllers or processors and such one or more controllers or processors need not be disposed proximal to one another and may be located in different devices or in different locations. The CPU 30 is operable to execute all of the various gaming methods and other processes disclosed herein. The main memory 32 includes a wagering game unit 34. In one embodiment, the wagering game unit 34 may present wagering games, such as video poker, video black jack, video slots, video lottery, etc., in whole or part.

The CPU 30 is also connected to an input/output (I/O) bus 36, which can include any suitable bus technologies, such as an AGTL+ frontside bus and a PCI backside bus. The I/O bus 36 is connected to various input devices 38, output devices 40, and input/output devices 42 such as those discussed above in connection with FIG. 1. The I/O bus 36 is also connected to storage unit 44 and external system interface 46, which is connected to external system(s) 48 (e.g., wagering game networks).

The external system 48 includes, in various aspects, a gaming network, other gaming terminals, a gaming server, a remote controller, communications hardware, or a variety of other interfaced systems or components, in any combination. In yet other aspects, the external system 48 may comprise a player's portable electronic device (e.g., cellular phone, electronic wallet, etc.) and the external system interface 46 is configured to facilitate wireless communication and data transfer between the portable electronic device and the CPU 30, such as by a near-field communication path operating via magnetic-field induction or a frequency-hopping spread spectrum RF signals (e.g., Bluetooth, etc.).

The gaming terminal 10 optionally communicates with the external system 48 such that the terminal operates as a thin, thick, or intermediate client. In general, a wagering game includes an RNG for generating a random number, game logic for determining the outcome based on the randomly generated number, and game assets (e.g., art, sound, etc.) for presenting the determined outcome to a player in an audio-visual manner. The RNG, game logic, and game assets are contained within the gaming terminal 10 ("thick client" gaming terminal), the external system 48 ("thin client" gaming terminal), or are distributed therebetween in any suitable manner ("intermediate client" gaming terminal).

The gaming terminal 10 may include additional peripheral devices or more than one of each component shown in FIG. 2. Any component of the gaming terminal architecture may include hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic disk storage media, optical storage media, flash memory, etc.

Figure 3:
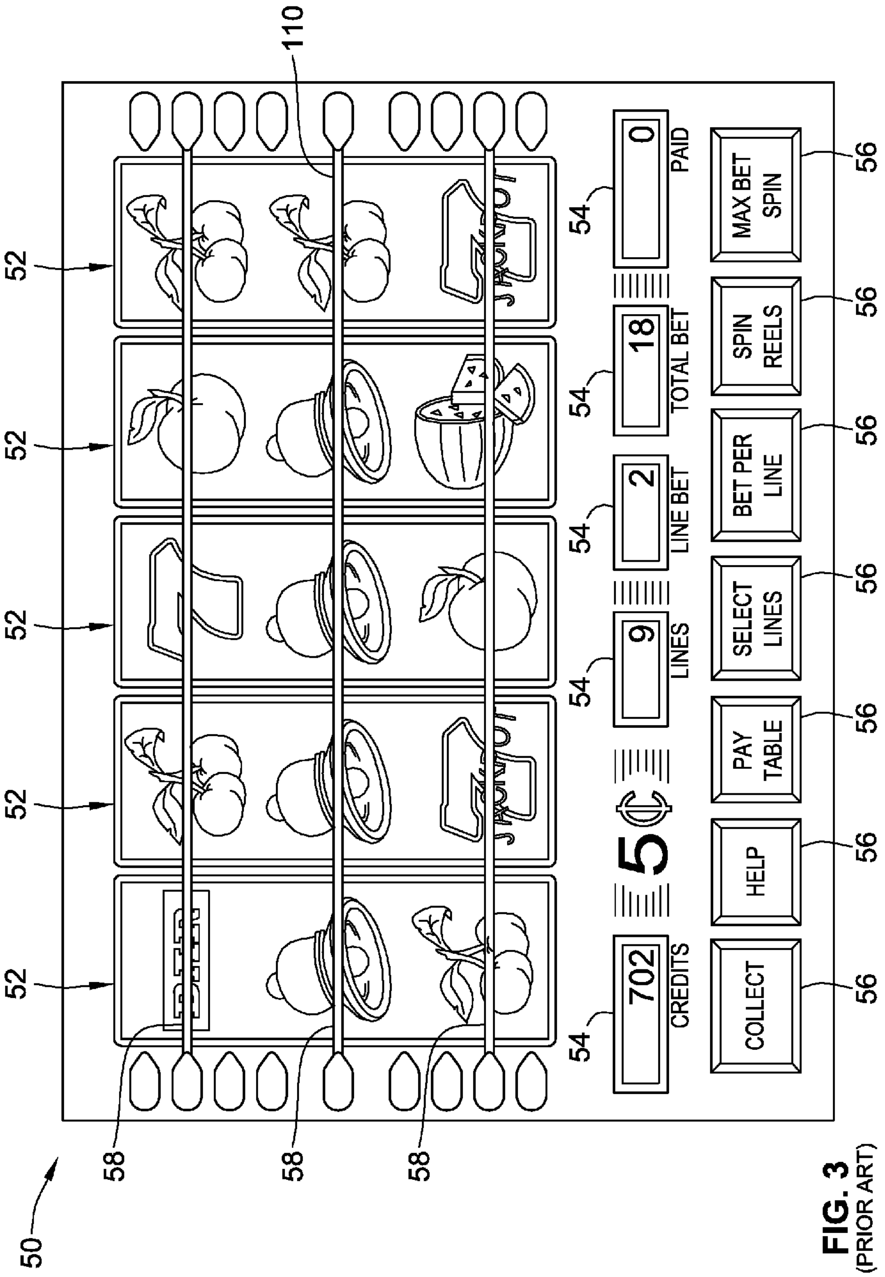
FIG. 3 (PRIOR ART)
FIG. 3 is an image of an exemplary basic-game screen of a wagering game displayed on a gaming terminal, according to an embodiment of the present disclosure.

Referring now to FIG. 3, there is illustrated an image of a basic-game screen 50 adapted to be displayed on the primary display area 12 or the secondary display area 14. The basic-game screen 50 portrays a plurality of simulated symbol-bearing reels 52. Alternatively or additionally, the basic-game screen 50 portrays a plurality of mechanical reels or other video or mechanical presentation consistent with the game format and theme. The basic-game screen 50 also advantageously displays one or more game-session credit meters 54 and various touch screen buttons 56 adapted to be actuated by a player. A player can operate or interact with the wagering game using these touch screen buttons or other input devices such as the buttons 20 shown in FIG. 1. The CPU operate(s) to execute a wagering game program causing the primary display area 12 or the secondary display area 14 to display the wagering game.

In response to receiving a wager, the reels 52 are rotated and stopped to place symbols on the reels in visual association with paylines such as paylines 58. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering game outcome is provided or displayed in response to the wager being received or detected. The wagering game outcome is then revealed to the player in due course following initiation of the wagering game. The method comprises the acts of conducting the wagering game using a gaming apparatus, such as the gaming terminal 10 depicted in FIG. 1, following receipt of an input from the player to initiate the wagering game. The gaming terminal 10 then communicates the wagering game outcome to the player via one or more output devices (e.g., primary display 12 or secondary display 14) through the display of information such as, but not limited to, text, graphics, static images, moving images, etc., or any combination thereof. In accord with the method of conducting the wagering game, the CPU transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the CPU (e.g., CPU 30) is configured to process the electronic data signal, to interpret the data signal (e.g., data signals corresponding to a wager input), and to cause further actions associated with the interpretation of the signal in accord with computer instructions relating to such further actions executed by the controller. As one example, the CPU causes the recording of a digital representation of the wager in one or more storage media (e.g., storage unit 44), the CPU, in accord with associated computer instructions, causing the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM), etc. The noted second state of the data storage media comprises storage in the storage media of data representing the electronic data signal from the CPU (e.g., the wager in the present example). As another example, the CPU further, in accord with the execution of the instructions relating to the wagering game, causes the primary display 12, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of computer instructions relating to the wagering game is further conducted in accord with a random outcome (e.g., determined by a RNG) that is used by the CPU to determine the outcome of the game sequence, using a game logic for determining the outcome based on the randomly generated number. In at least some aspects, the CPU is configured to determine an outcome of the game sequence at least partially in response to the random parameter.

Figure 4:
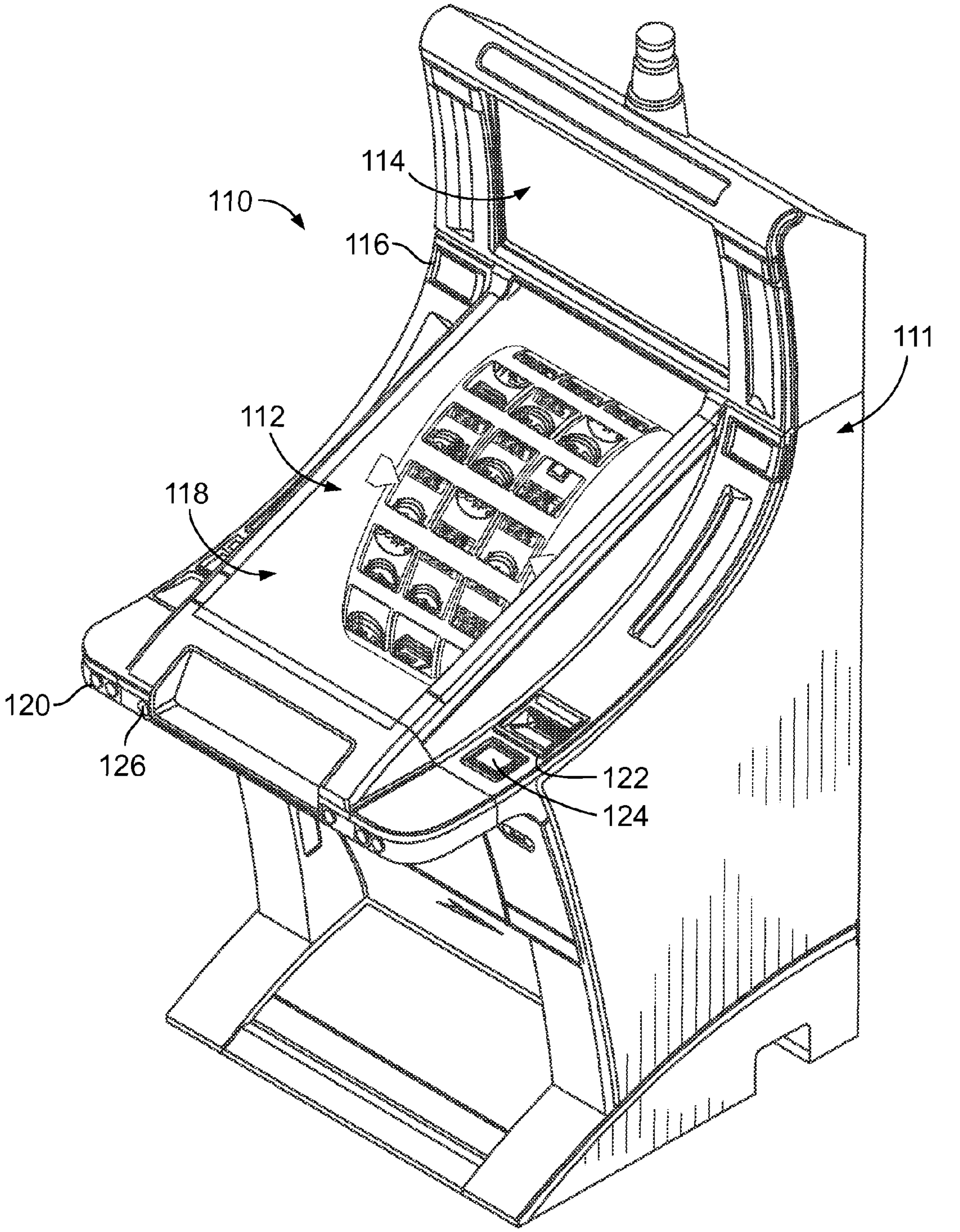
FIG. 4 is a perspective view of a free-standing gaming terminal including a primary display area with a video display configured for portraying a wagering game outcome according to the present disclosure.

Referring now to FIG. 4, which is a perspective view of a free-standing gaming terminal 110 including a primary display area 112 and a secondary display area 114 situated generally in a cabinet 111. Similar in some respects to the gaming terminal 10 of FIG. 1, the gaming terminal 110 includes audio speaker(s) 116, a bill validator 122, an information reader/writer 124, and one or more information ports 126 for conveying information to (and receiving information from) a player of the gaming terminal 110. However, the gaming terminal 110 provides a different form factor than the gaming terminal 10 shown in FIG. 1 and described above. For example, the primary display area 112 of the gaming terminal 110 can be substantially larger, in a vertical direction, than the primary display area 12 of the previously described gaming terminal 10 shown in FIG. 1.

The primary display area 112 of the gaming terminal 110 shown in FIG. 4 is situated to advantageously provide an interactive sensory experience for a player. For example, by being disposed (e.g., mounted) in the cabinet 111 such that an outward surface of the primary display area 112 defines a plane making an acute angle with a ground surface, while the gaming terminal 110 rests on the ground, a player of the gaming terminal 110 is generally invited to lean over the gaming terminal 110 and thereby become more engaged in the wagering game played thereon. Similar to the primary display area 12 of the gaming terminal 10 shown in FIG. 1, the primary display area 112 can include one or more mechanical reels and/or moving parts and can include one or more light emissive and/or light transmissive displays. The primary display area 112 can thus present a combination of displays and/or mechanical elements configured to portray an outcome of a wagering game. Furthermore, the primary display area 112 can include a touch-sensitive screen 118 defining touch-activated buttons and/or or regions to allow the player to provide user inputs using, for example, touches, gestures, motions, etc. across the touch-sensitive screen 118 to thereby operate a wagering game provided via the gaming terminal 110.

In FIG. 4, the primary display area 112 portrays an exemplary portrayal of a wagering game outcome. The primary display area 112 includes a video display mounted in the gaming terminal 110 to provide video content in the primary display area 112. Exemplary portrayals of wagering game outcomes described herein are provided by displaying video content on the video display mounted in the primary display area 112. In the portrayal in FIG. 4, a rotating wheel having multiple moving reels disposed about the exterior cylindrical wall of the rotating wheel is displayed on the video display. The portrayal of the rotating wheel will be described below in connection with FIGS. 5-6, which are screen shots of the video display during stages of the outcome portrayals described herein. While the portrayal of a wagering game outcome on a rotating wheel is described herein in connection with the gaming terminal 110 of FIG. 4, it is envisioned that alternatives may use alternative form factors with alternative primary display areas, such as the gaming terminal 10 having the primary display area 12 shown in FIG. 1, for example.

The video content displayed on the primary display area 112 of a gaming terminal 110 can be provided by a flat panel display mounted in the cabinet of the gaming gaming terminal 110, such as an LCD, plasma, OLED, LED, or similar display technology allowing for selective light reflection, transmission, and/or emission to produce video content. Video content on such a flat panel display can be provided via a video driver configured to render display information according to a video data stream. The video data stream, in combination with the video driver and the video display, generate moving images to render the wheel having symbol arrays disposed about its exterior cylindrical surface, such that the video-rendered wheel resembles the moving wheel 200 of FIG. 5. Thus, while the various wagering game outcome portrayals described in connection with the screen shots of FIGS. 5-7 refer to features in motion, and which move, or stop, it is noted that such movement described herein is generally simulated movement, portrayed by providing appropriate video content on the video display to cause various displayed features to appear in motion.

Generally, the wagering game is operated such that in response to receiving a user input to initiate the wagering game, an outcome of the wagering game is determined, such as via an RNG, similar to the process described in connection with FIGS. 1-3. To portray the determined outcome, a plurality of symbols are randomly populated in symbol positions of one or more symbol arrays, at least some of which indicate the determined outcome represented in a pay table associated with the symbol arrays. The random generation of the symbols to populate the symbol positions of the one or more symbol arrays is thus generally carried out to portray a randomly determined wagering game outcome. The determination is generally carried out to provide a desired expected value for the wagering game, over time, and which may be at least partially specified and/or regulated by one or more regulatory authorities.

In some instances a wagering game terminal includes an indicator region forming at least a portion of a primary display area (e.g., the primary display areas 112) such that symbol arrays appearing within the indicator region are associated with a determined outcome of the wagering game. As will be described in connection with FIGS. 5-7, a wagering game outcome can be portrayed as one or more symbol arrays moving relative to an indicator region while the symbol arrays independently display dynamic content in their respective symbol positions to appear as though symbols are also moving within each symbol array position. The dynamic content in the symbol positions concludes with a single symbol being displayed at each symbol position. The movement of the symbol arrays concludes so that the symbol arrays stop moving with respect to the indicator region. The determined outcome of the wagering game is an outcome associated with one or more symbol arrays, if any, appearing within the indicator region. From a player's perspective, the indicator region is a region of the primary display area in which symbol arrays are evaluated to determine an outcome.

Figure 5:
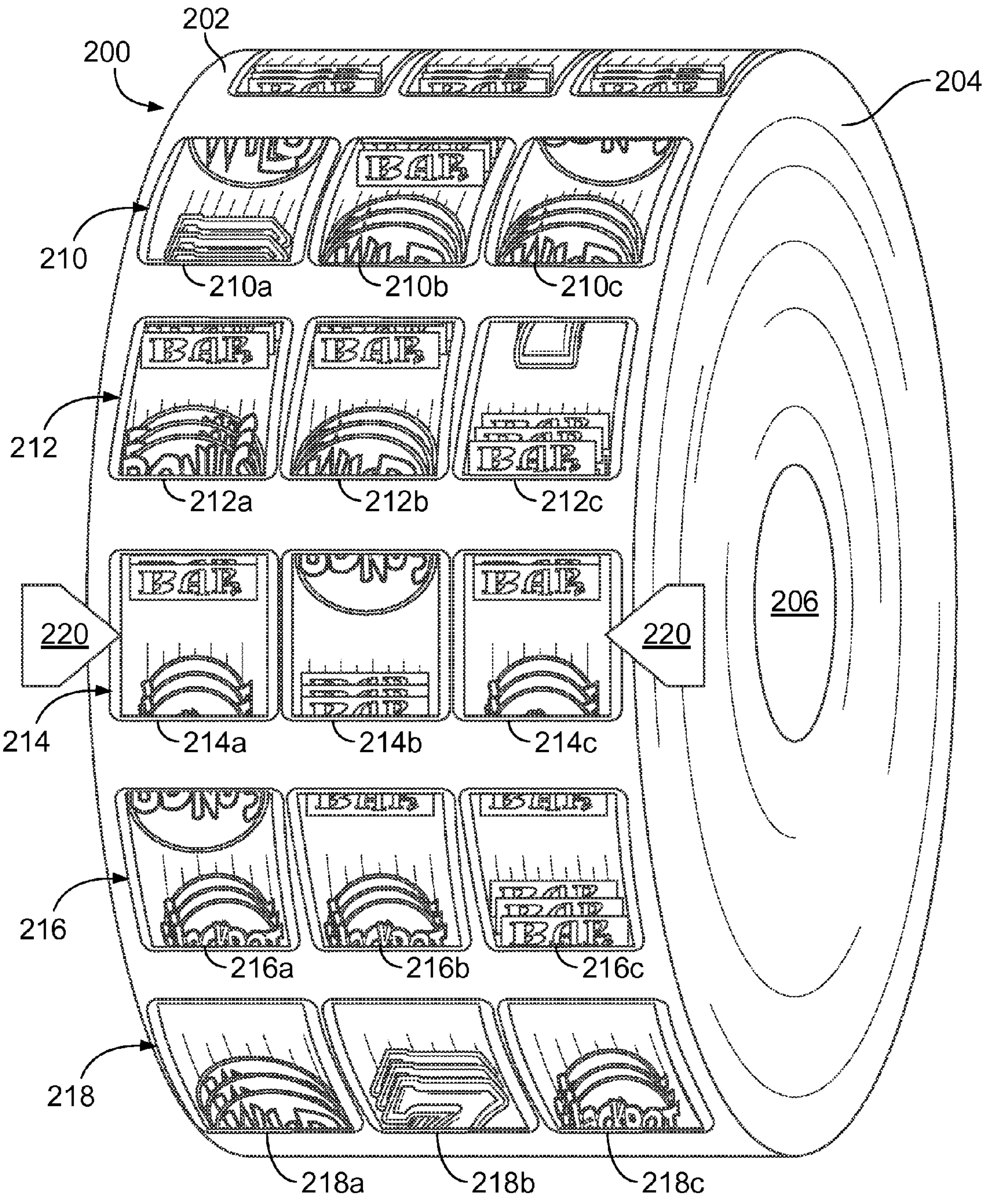
FIG. 5 is a screen shot of a portion of an exemplary portrayal of a wagering game outcome that can be provided on the primary display area of the gaming terminal shown in FIG. 4.

FIG. 5 is a screen shot of a portion of an exemplary portrayal of a wagering game outcome that can be provided on the video display in the primary display area 112 of the gaming terminal 110 shown in FIG. 4. The screen shot shown in FIG. 5 includes a moving wheel 200. As displayed in the screen shot of FIG. 5, the moving wheel 200 includes an exterior cylindrical surface 202, a first circular side wall 206, a second circular side wall opposite the first (not visible), and a central axis 206. A plurality of symbol arrays 210, 212, 214, 216, 218 are situated on the exterior cylindrical wall 202. The plurality of symbol arrays 210-218 can be substantially evenly dispersed about the exterior cylindrical wall, such that adjacent ones of the symbol arrays 210-218 are approximately equidistant from one another, as measured by arc length distances along the surface of the exterior cylindrical surface 202. The exterior cylindrical surface 202 can appear to be a surface that is substantially equidistant, in a radial direction, from the central axis 206. During portrayal of an exemplary wagering game outcome, the video display is provided with video content to render the moving wheel 200 rotating about the central axis 206 so as to cause the symbol arrays 210-218 to move through the primary display area 112.

Each of the symbol arrays 210-218 includes a matrix of symbol positions. In the example shown in FIG. 5, the symbol arrays 210-218 are each 1 row by 3 column matrices of symbol positions. For example, the symbol array 210 includes a first dynamic symbol position 210*a*, a second dynamic symbol position 210*b*, and a third dynamic symbol position 210*c*. The symbol arrays 212, 214, 216, 218 each include respective dynamic first, second and third dynamic symbol positions as well, i.e., the positions 212*a-c*, 214*a-c*, 216*a-c*, and 218*a-c*, respectively. As discussed further herein, the symbol arrays 210-218 are rendered to display dynamic content in each symbol position of the symbol array during a portrayal of a wagering game outcome, via video content displayed on the video display in the primary display area 112. Thus, the video content rendered on the video display simulates the rotation of the moving wheel 200 having symbol arrays 210-218 mounted on its exterior, and with each symbol position in the symbol arrays 210-218 having individual reel strips of symbols passing through the symbol positions to thereby display dynamic content in the symbol positions. To enhance a user's experience and excitement, the simulation of rotating wheel, via the video display, can be enhanced by providing sounds (via the speakers 116) corresponding to the sound of a wheel rotating about an axle and/or sounds of reel strips being passed through symbol positions of a symbol array.

Aspects of the present disclosure also extend to symbol arrays of other sizes, such as symbol arrays with 3 rows and 5 columns, 3 rows and 4 columns, 2 rows and 3 columns, 1 rows and 5 columns, 5 rows and 4 columns, 5 rows and 3 columns, etc. FIG. 5 also illustrates payline indicators 220, which are shown as generally triangular arrow heads disposed on either side of the exterior side wall 202 near a middle height of the moving wheel 200. The payline indicators 220 indicate a payline for the wagering game which is evaluated on any symbol array that stops moving at a location between the first and second payline indicators 220. As will be described in connection with FIG. 6, the payline indicators 220 also indicate an indicator region (e.g., the indicator region 225 of FIG. 6) for the wagering game. The indicator region 225 is generally a region encompassing a single one of the symbol arrays (e.g., one of the symbol arrays 210-218) that is situated between the payline indicators 220.

In some embodiments, the moving wheel 200 rotates in a direction such that the symbol arrays 210-218 move generally downward through the primary display area 112, with each first appearing near the top of the moving wheel 200 and traveling to the bottom of the moving wheel 200 until no longer visible, and then appearing again on the top side. By allowing the symbol arrays to appear to loop around from the bottom side, and then appear again on the top side, the simulation of the moving wheel 200 can be enhanced by contributing to a user's perception that each symbol array is fixed to the surface of a rotating wheel that includes a back side where the symbol arrays are not visible while the wheel 200 rotates. In some embodiments, the payline indicators 220 do not rotate with the moving wheel 200 and remain in a fixed position of the primary display area 112. Thus, while approximately 5 separate symbol arrays 210, 212, 214, 216, 218 are shown on the visible side of the exterior cylindrical surface 202 of the moving wheel 200 in FIG. 5, the moving wheel 200 can appear to include additional symbol arrays on its non-visible backside, which become visible as the moving wheel 200 rotates about the central axis 206. In some embodiments, the moving wheel 200 rotates in the opposite direction about the central axis, such that the symbol arrays 210-218 first appear near the bottom of the moving wheel 200 and traveling to the top of the moving wheel 200 until no longer visible. Furthermore, the moving wheel 200 can translate horizontally back and forth (i.e., along a direction parallel to the orientation of the central axis 206). Translating the moving wheel 200 horizontally can create uncertainty, for a player, as to whether any of the symbol arrays 210-218 will stop moving in a location between the payline indicators 220, and thus raise a player's expectation of a zero outcome due to no symbol arrays stop moving between the payline indicators 220, and also raise a player's relief when at least some symbol arrays stop between the payline indicators 220.

In addition, while the moving wheel 200 rotates, dynamic content is displayed within the symbol positions of each of the symbol arrays 210-218. The dynamic content can be a series of symbols vertically in motion through columns of the symbol arrays so as to appear as a vertical reel strip of symbols being fed through the columns ("reels") of the symbol arrays. For example, while dynamic content is displayed on the symbol array 210, each symbol position 210*a*, 210*b*, 210*c* shows a series of symbols passing through the symbol positions, one after another. The symbols can pass through the symbol positions from any direction, and at any orientation, such as in a "vertical direction," which can be defined as a direction approximately tangentially along a surface of the exterior cylindrical surface 202 and approximately perpendicular to an orientation of the central axis 206. In some instances, each symbol array (e.g., the symbol array 210) on the wheel 200 can be displayed as including a plurality of separate reels (e.g., reel strips) that are appear to rotate through each separate column of the symbol array 210. In some instances, the separate reels for each column can appear to rotate at different rates, or can appear to undergo coordinated rotation. By way of example, each column of the symbol array 210 can be an independent reel. In another example, each symbol array position (e.g., the positions 210*a-c*) within each column can appear to be an independent reel that is independent rotated to cause symbols to appear to pass through each symbol position. For example, in a 3 by 3 symbol array, the symbol array can be displayed to appear to have a separate, independent reel ("mini-reel") at each symbol position of the 3 by 3 symbol array, such that there appear to be 9 total mini-reels in the 3 by 3 symbol array.

The dynamic content, e.g., series of symbols, concludes with the appropriate randomly generated symbol for each symbol position. For example, in the symbol array 210 the first dynamic symbol position 210*a* is shown in transition between a WILD symbol and a SEVEN symbol, which are traversing vertically through the first dynamic symbol position 210*a*. Thus, player excitement and entertainment is enhanced not only by movement of the symbol arrays 210-218 with respect to the payline indicators 220 (which also indicate the indicator region 225), but also by movement of symbols within each symbol array position (e.g., the symbol positions 210*a-c*). Aspects of the present disclosure accordingly combine movement of symbols within symbol positions of symbol arrays with movement of the symbol arrays themselves with respect to a payline (e.g., the payline 220) and/or an indicator region of a primary display area 112 (e.g., the indicator region 225).

The dynamic content (e.g., series of symbols) within each symbol position can optionally conclude nearly simultaneously for all symbol positions of a symbol array. Alternatively, the individual symbol positions can conclude the portrayal of dynamic content at different times, such that some symbol positions continue to portray dynamic content while others in the same symbol array (or other symbol arrays) have concluded and display a single symbol. In some examples, each column of each symbol array can conclude its display of dynamic content nearly simultaneously, such as on a regular interval. By allowing some of the symbol positions to display their respective final symbols while other symbol positions continue to display moving symbols and/or while the symbol arrays continue to move, player anticipation of the outcome can be enhanced.

To further generate player excitement and enjoyment, the rate of movement of the symbol arrays 210-218 can be non-uniform. For example, the rate of rotation of the moving wheel 200 can gradually slow down to a stop, or the moving wheel 200 can stop suddenly with only minimal warning evident to a player. At the same time, the rate of movement within the symbol array due to the dynamic content provided at each symbol position can be non-uniform. For example, symbols can initially be displayed to pass through the symbol positions rapidly and gradually slow down until the randomly generated symbols are displayed at their respective positions. In some embodiments, the symbols can start passing through the symbol position at a first rate, and then undergo a roughly constant deceleration until the dynamic content stops and the appropriate randomly generated symbols are displayed at each symbol position. An example with constantly decelerating dynamic content can allow a player to perceive a reel strip initiated to move at a first speed and that experiences motion-opposing frictional drag. Additionally or alternatively, the dynamic content can begin at a first rate, and undergo one or more sudden and/or gradual changes in speed before concluding.

Allowing the rate of the dynamic content (e.g., rate of movement of the symbols passing through the symbol positions) and/or the rate of movement of the symbol arrays (e.g., the rate of rotation of the moving wheel 200) to gradually slow down enhances anticipation and excitement by players of the gaming system. In addition, allowing one of the symbol array movement or dynamic content movement to conclude prior to the other one builds player excitement and anticipation by allowing the player to see the final symbols in each symbol array (when the dynamic content concludes first) or the final position of the symbol array (when the symbol array movement terminates first). In some embodiments, the movement of the symbol arrays and the movement of the dynamic content can be coordinated such that the movements are initiated and/or concluded nearly simultaneously, either of which can contribute to player excitement and anticipation of the eventual outcome to be portrayed.

Figure 6:
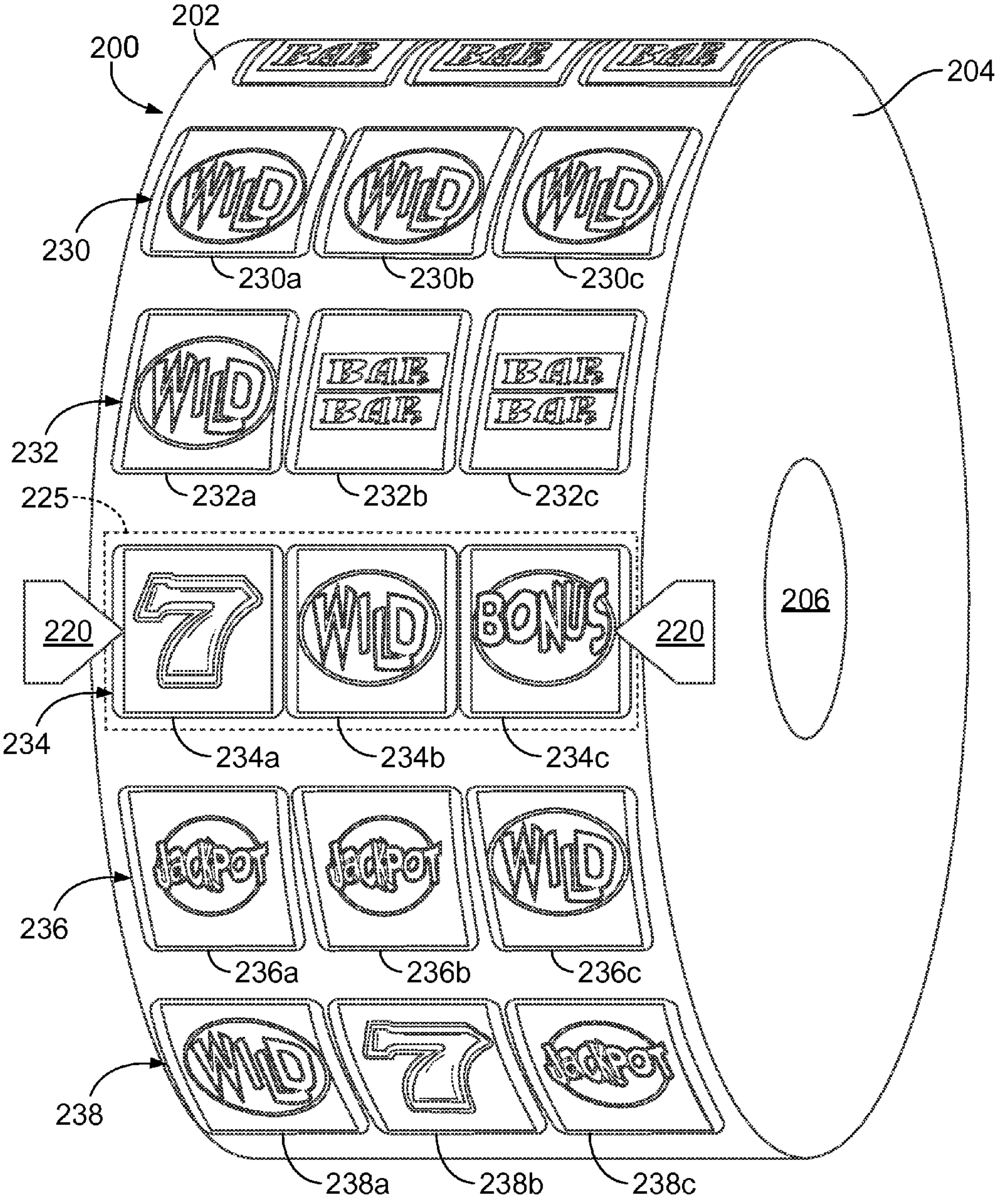
FIG. 6 is another screen shot of the wagering game outcome shown in FIG. 5 after the movement of the wheel and movement of the symbols in the symbol arrays has stopped.

FIG. 6 is another screen shot of the wagering game outcome shown in FIG. 5 after the movement of the wheel 200 and movement of the symbols in the symbol arrays has stopped. In FIG. 6, at least some of the symbol arrays displayed on the exterior cylindrical surface 202 provide an indication of an outcome of the wagering game. The symbol arrays 230, 232, 234, 236, 238 are displayed on the exterior cylindrical surface 202. Generally, the symbol arrays 230, 232, 234, 236, 238 displayed in the screen shot in FIG. 6 can be symbol arrays that newly appeared on the wheel 200 after displaying the screen shot in FIG. 5 with the symbol arrays 210-218. Alternatively, at least some of the symbol arrays 230-238 in FIG. 6 can be appear to be continuously displayed versions of some of the symbol arrays 210-218 in FIG. 5. For example, during the portrayal of the game outcome, the top symbol array 210 in FIG. 5 can appear to rotate to the position of the symbol array 238 in FIG. 6, such that a user perceives the symbol array 238 in FIG. 6 as a later position of the symbol array 210 in FIG. 5.

In the portion of the outcome portrayal shown in FIG. 6, both the display of dynamic content in the symbol positions and the movement of the symbol arrays 230-238 have concluded. Accordingly, each of the symbol arrays 230-238 is populated by the previously randomly generated symbols. The symbol array 230 located nearest the top visible edge of the fixed wheel 201 includes a first fixed symbol position 230*a*, a second fixed symbol position 230*b*, and a third fixed symbol position 230*c*, which are each WILD symbols. The symbol array 234, which is located between the pay line indicators 220, 222 includes a first fixed symbol position 234*a*, a second fixed symbol position 234*b*, and a third fixed symbol position 234*c*, which are populated with a SEVEN symbol, a WILD symbol, and a BONUS feature, respectively. Similarly, the symbol arrays 232, 236, 238, are populated by their respective randomly generated symbols in their fixed first, second, and third symbol positions 232*a-c*, 236*a-c*, and 238*a-c*, respectively.

In the example portrayal of an outcome of a wagering game disclosed in connection with FIGS. 5 and 6, the outcome of the wagering game is indicated by evaluation of any active pay lines on the symbol array 234 appearing within the indicator region 225. Thus, the outcome of the wagering game, which is previously randomly determined, corresponds to an entry in a pay table corresponding to the payline for the symbols in the symbol array 234: SEVEN, WILD, BONUS.

The region located between the payline indicators 220 defines an indicator region 225, which comprises at least a portion of the primary display area 112. The indicator region 225 is accordingly sized to have dimensions sufficient to contain at least one of the symbol arrays (e.g., the symbol array 234). The dimensions of the indicator region 225 are desirably small enough that the indicator region 225 does not overlap on other ones of the symbol arrays, such as the symbol array 236 below, or the symbol array 232 above. Accordingly, the dimensions of the indicator region 225 can be determined, at least in part by the dimensions of the symbol arrays (e.g., the size of the symbol array 234) and the amount of spacing between adjacent symbol arrays (e.g., the spacing between the symbol arrays 232 and 234).

Thus, in an example with symbol arrays having 3 rows and 3 columns (i.e., a 3 by 3 symbol array), the indicator region 225 can be large enough to allow a 3 row by 3 column symbol array to appear within the indicator region 225. It is also noted that an example with a 3 by 3 symbol array may be configured to have less total symbol arrays disposed about the exterior cylindrical surface 202, but still maintain a comparable number of total rows cumulatively across all the symbol arrays as in the wheel 200 with 1 by 3 symbol arrays. For example, 3 by 3 symbol arrays may be displayed such that approximately 7 total rows are visible on the exterior cylindrical surface 202 at one time. For example, where a first 3 by 3 symbol array stops near the middle of the wheel, two rows may be visible near the top of the wheel that are the bottom two rows of a second 3 by 3 symbol array moving on to the wheel, and two rows may be visible near the bottom of the wheel that are the top two rows of a third 3 by 3 symbol array moving off of the wheel. In another example, the symbol arrays can have 5 rows and 3 columns, or can have 5 rows and 4 columns, etc. Generally, the number of individual symbol positions simultaneously visible during a portrayal can be determined by the amount of visible surface area on the exterior cylindrical surface 202, the dimensions of the individual symbol positions, and the spacing between adjacent symbol arrays. Thus, a desired number of simultaneously visible symbol positions can be achieved by adjusting the relative sizes of the wheel 200, the dimensions of the symbol positions, and the spacing between symbol arrays.

Furthermore, in some instances the symbol arrays can be different sizes. For example, some of the symbol arrays situated on the exterior surface 202 can be 1 row by 3 columns while others are 3 rows by 3 columns, for example. The indicator region can be sized according to the largest symbol array, to ensure even the largest symbol array can be situated within the symbol array. The symbol array can also be sized according to the smallest symbol array and arrays larger than the symbol array can indicate outcomes of the wagering game according to any portion of a symbol array that lands within the indicator region. For example, outcomes can be portrayed in accordance with a "scatter" payout formula that provides awards associated with particular symbols, regardless of symbol positions. By selecting a portion of a symbol array with an appropriately sized indicator region, the symbols within the indicator region can indicate the wagering game outcome.

In some instances, the indicator region 225 is indicated solely by payline indicators (e.g., the indicators 220) or by other arrows, pointers, or direction-indicating features for indicating at least one symbol array. The indicator region 225 can alternatively or additionally be distinguished by an outlined (or at least partially outlined) region of the primary display area 112. Additionally or alternatively, the indicator region 225 can be distinguished by a visually contrasting feature of the indicator region 225 with respect to a surrounding region of the primary display area 112, such as a differential contrast or coloring in the indicator region 225 in comparison to surrounding regions of the primary display area 112, which contrast can be generated via corresponding video content provided to the video display mounted in the primary display area 112. The indicator region 225 can also move along the wheel 200 to "capture" certain symbol arrays that appear within the indicator region once one (or both) of the symbol arrays and the indicator region 225 stop moving with respect to one another.

Figure 7:
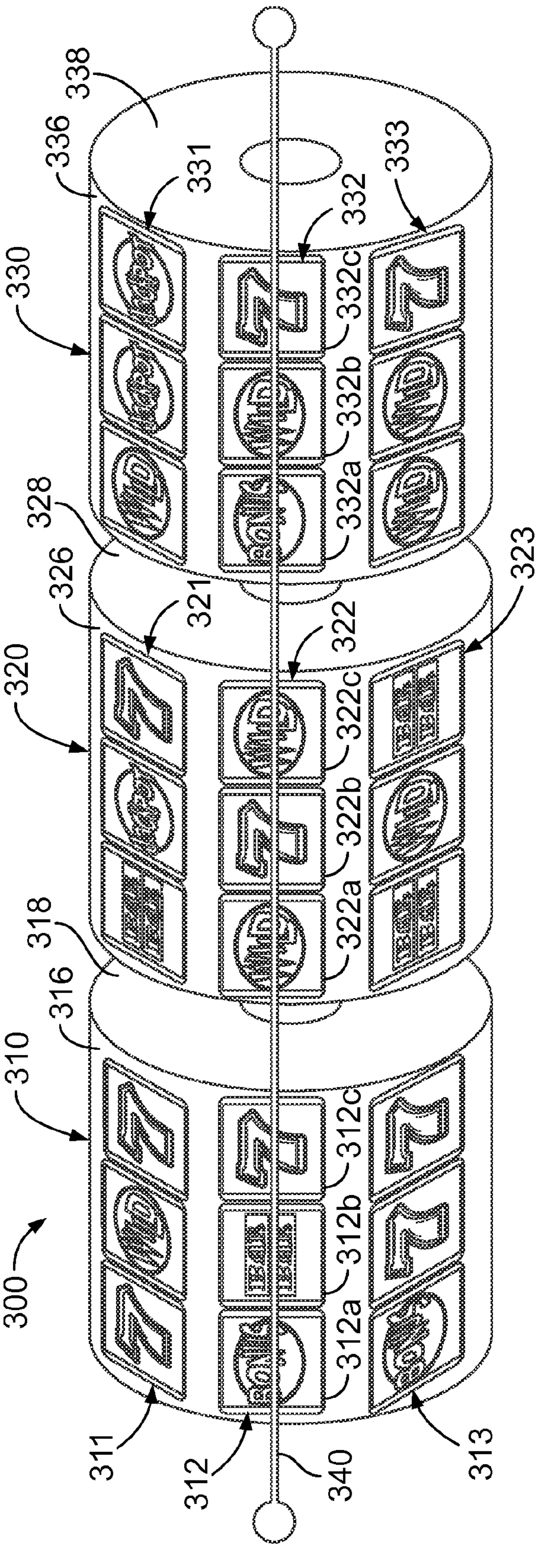
FIG. 7 is a screen shot of another exemplary portrayal of a wagering game outcome incorporating moving symbol arrays and dynamic content in the symbol positions of the arrays.

FIG. 7 is a screen shot of another exemplary portrayal 300 of a wagering game outcome incorporating moving symbol arrays and dynamic content in the symbol positions of the arrays. The portrayal 300 includes a first wheel 310, a second wheel 320, and a third wheel 330. Each of the three wheels 310, 320, 330 is displayed to include a respective exterior cylindrical surface 316, 326, 336 and a first circular side wall 318, 328, 338. The three wheels 310, 320, 330 are displayed to be aligned in a common orientation with a central axis of each cylinder along a common line 340. In addition, the three wheels 310, 320, 330 are aligned such that each of their central axes appear to be arranged along a single straight line. In some embodiments, the three wheels can be displayed via a video display mounted within a primary display area of a gaming terminal (e.g., the primary display area 112 of the gaming terminal 110 or the primary display area 12 of the gaming terminal 10) to portray an outcome of a wagering game.

As shown in the screen shot in FIG. 6, each of the three wheels 310, 320, 330 includes multiple symbol arrays situated on the exterior cylindrical surfaces 316, 326, 336. The displayed dimensions of the wheels 310, 320, 330 and the symbol arrays are such that each of the wheels 310, 320, 330 displays approximately 3 symbol arrays on their respective exterior cylindrical surfaces 316, 326, 336. For example, the first wheel 310 includes a first symbol array 311 near the top of the array first wheel 310, a second symbol array 312 near the middle, and a third symbol array 313 near the bottom. Each of the symbol arrays 311, 312, 313 is a matrix of symbol positions having 1 row and 3 columns. The second and third symbol arrays 320, 330 similarly include first, second, and third symbol arrays 321, 322, 323, and 331, 332, 333, respectively.

A pay line 340 is arranged to overlay a central portion of the three wheels 310, 320, 330. The pay line indicator thus defines an indicator region encompassing the second ("middle") symbol array of each wheel, i.e., the symbol arrays 312, 322, 332. The symbols populating the symbol array positions of the symbol arrays within the indicator region (e.g., the region indicated by the pay line 340) indicate the outcome of the wagering game. The outcome can be determined according to a pay table for each of the indicated symbol arrays 312, 322, 332 individually or according to a scatter-pay formula applied to a combination of more than one of the indicated symbol arrays 312, 322, 332, or a combination of individual and scatter-pay formulas. Thus, a predetermined randomly generated outcome of the wagering game is indicated according to an entry in one or more pay tables corresponding to the symbols in the symbol positions 312*a-c* of the symbol array 312: BONUS, BAR, SEVEN; the symbols in the symbol positions 322*a-c* of the symbol array 322: WILD, SEVEN, WILD; the symbols in the symbol positions 332*a-c* of the symbol array 332: BONUS, WILD, SEVEN; or some combination of these.

In an exemplary operation of a wagering game, an outcome of the wagering game is determined in response to receiving a user input. To portray the outcome to the player, video content is provided to cause the video display to render the three wheels 310, 320, 330 being set in motion (e.g., by rotating the wheels about their respective central axes) to cause the symbol arrays situated on the wheels 310, 320, 330 to move with respect to the pay line 340 indicating the indicator region. In some embodiments, some of the wheels 310, 320, 330 can rotate at different rates and/or in different directions with respect to others. For example, the first wheel 310 can rotate more slowly than the second wheel 320 while the third wheel 330 can rotate at a higher rate than both the first and second wheels 310, 320. In another example, the first wheel 310 can rotate clockwise while the second wheel 320 rotates counter-clockwise, with respect to a common direction of spin orientation. In a manner similar to the discussion of the simultaneous movement of the dynamic content within each symbol position of the moving wheel 200 discussed in connection with FIG. 5 above, the individual symbol positions of the symbol arrays on the wheels 310, 320, 330 each display dynamic content while the wheels rotate. The dynamic content can conclude before, after, or nearly simultaneously with the conclusion of the movement of the symbol arrays in order to generate player interest and excitement.

The various moving wheels described in connection with FIGS. 5-7 are described as simulated portrayals of rotating wheels via video content rendered on a video display. However, the present disclosure also applies to portrayals utilizing mechanical rotating wheels with symbol arrays mounted on surfaces of the wheels. In a mechanical implementation, movement of the symbol arrays with respect to an indicator region of a primary display area of a gaming terminal is generally achieved via movement (e.g., rotation) of the mechanical rotating wheels, rather than by portraying video content on a video display. In some instances, video displays can be situated on the exterior surface of the mechanical wheel at the symbol positions of the symbol arrays to allow for the display of dynamic content in the symbol positions while the wheel rotates so as to move the symbol arrays with respect to an indicator region. An example with a mechanical rotating wheel can be portrayed by mounting a rotating wheel within a primary display area of a gaming terminal.

In the examples shown in FIGS. 5-7, the indicator region is distinguished by pay line indicators (e.g., the payline indicators 220 in FIGS. 5-6) or by a payline (e.g., the payline 340 in FIG. 7). However, in an implementation, the indicator region can be one or more window(s) or region(s) of a primary display area and can be completely independent from a payline, if any. For example, the indicator region can be a region sufficient to encompass a 3 row by 3 column symbol array, and the symbol array, once stopped within the indicator region, can indicate an outcome according to one or more than one paylines. Indicator regions described herein can be distinguished from their surroundings by differential coloring and/or shading. Indicator regions can be distinguished by a border that at least partially surrounds the indicator region. The indicator region can be defined such that symbol arrays indicate the outcome of the wagering game if, and only if, the symbol arrays stop moving so as to be enclosed entirely within the indicator region. In other examples, symbol arrays that stop moving so as to be at least partially within the indicator region indicate the outcome of the wagering game. In still other examples, symbol arrays that stop moving so as to have a portion within the indicator region indicate the outcome according to a "scatter" pay formula applied to the symbol positions, if any, appearing within the indicator region. When the indicator region encompasses more than one symbol arrays (or fractions of symbol arrays) stopped within the indicator region, each of the encompassed symbol arrays can be separately evaluated to arrive at an outcome, or the symbol arrays can be cumulatively evaluated as a scatter pay to provide awards according to a pay table regardless of the location of the symbols on the more than one symbol arrays.

While FIGS. 5-7 provide for symbol arrays to be portrayed as moving with respect to an indicator region by displaying symbol arrays as being situated about an exterior cylindrical surface of a rotating wheel, the present disclosure is not so limited. Symbol arrays with dynamic content (e.g., moving reels) can also be displayed as being situated on a flat circular surface of a wheel rotating about its central axis, with the wheel displayed to be oriented such that the axis of rotation is oriented substantially perpendicular to the plane defined by the video display (e.g., the video display in the primary display area 112 of the wagering game 110 shown in FIG. 4). For example, a rotating wheel can be displayed as being divided into multiple wedges having similar sizes and each wedge can include a symbol array near the outer circumference of the wheel. The video display can render a portion of the wheel, such as a left half, rotating through the primary display area 112 of the gaming terminal 110.

Displaying portrayals of wagering game outcomes by displaying symbol arrays as situated on moving ("rotating") mechanical structures, such as wheels, provide examples where the path of movement of the symbol arrays through the video display occurs along a predetermined path (e.g., along the exterior cylindrical surfaces of the wheels 200, 310, or along arc-shaped paths defined by a flat circular surface rotating about its central axis). Embodiments with symbol arrays moving along predetermined, predictable paths allow players to anticipate an upcoming location of each symbol array as it traverses the predictable, defined path characterized by the circumference of a wheel. Other predictable, defined paths can also be utilized to provide wagering games according to the present disclosure, such as a path tracing an outline of a rectangle or another shape, for example.

The present disclosure also applies to symbol arrays displayed as moving with respect to an indicator region independent of the constraints of a surface of a rotating wheel, or any other predictable path. In some instances, symbol arrays can be manipulated to be moved through an indicator region while their symbol positions display dynamic content. In contrast to operating the video display to "loop" the symbol arrays about the wheel, to cause symbol arrays that appear at one instant to become visible again at a later time (which aids the simulation of the rotating wheel), the symbol arrays can be moved through the indicator region in a random way independent of the constraints of a wheel. Thus, symbol arrays can be scrolled across the video display of the gaming terminal so as to be moved with respect to the indicator region, such that once the symbol arrays are scrolled across the video display they do not appear again. That is, new symbol arrays entering the display area can be independent of symbol arrays appearing previously.

In addition, the timing, order, paths of travel, and/or the symbol array sizes can be selected such that those aspects are unpredictable. Further still, symbol arrays can be moved along a path independent of any surface of a rotating wheel, scrolling path, or other simulated mechanical element. For example, the symbol arrays can be configured to move along a trajectory that is predetermined or can be dynamically determined based on user inputs and/or randomly generated values. A trajectory can be provided that is substantially unpredictable to a player, or can be a trajectory where a symbol array appears to move as if being acted on by a nearly constant acceleration and/or motion-opposing drag force so as to appear as though the symbol array traverses a ballistic path. Incorporating seemingly random (i.e., unpredictable) aspects in the portrayal of the moving symbol arrays with respect to the indicator region, uncertainty and anticipation of an accompanying unpredictable result is enhanced, which contributes to player excitement and enjoyment when viewing the portrayals of the wagering game outcomes described herein.

The touch screen 118 can be utilized to capture user inputs indicative of gestures by the player. For example, a player can swipe across the touch screen 118 to provide inputs indicative of an initial direction and/or speed of the symbol array trajectory path. Using the touch screen 118, a player can "fling" symbol arrays on trajectories across the display as desired by the player to place the symbol array at or near an indicator region where the symbol array will be evaluated to generate an outcome. Sometimes even where the initial direction and speed of a trajectory path of a symbol array is set by the player (e.g., via touch screen input), the final location of the symbol array can still be at least partially randomly determined (or displayed according to the determined outcome). The random or pseudo-random nature of the final location can be at least partially disguised by displays of chaotic collisions with other symbol arrays and/or other path-influencing features on the display such that the path of the initial trajectory is adjusted according to a desired randomly generated final location.

The position of the indicator region is not fixed with respect to a primary display area of a gaming terminal, and instead moves with respect to the primary display area. In embodiments with a moving indicator region, the symbol arrays can optionally remain static, with respect to the primary display area, while the indicator region moves, during a portrayal of a wagering game outcome. The movement of the indicator region can be at least partially randomly determined or can be determined such that a desired one of the symbol arrays is within the indicator region when the movement of the symbol arrays stops, so as to indicate an outcome according to the randomly generated outcome and/or a desired expected value of the wagering game. For example, the indicator region can be moved to encompass at least one symbol for a "scatter" type of payout. Thus, various methods exist to allow a player to at least partially influence a trajectory of the symbol array without changing the results of the wagering game. Similarly, user inputs, such as touch screen inputs, can be provided to influence the movement of the dynamic content provided within each symbol position of the symbol arrays.

In an example of a pseudo-random path, a display is provided that includes an array of bumper pegs, similar in some respects to a pachinko game, or a video pachinko game. Symbol arrays can be configured to be video rendered as displayed upon round-shaped balls or other elements suitable for traversing the array of bumper pegs. The symbol arrays can be launched according to user inputs or otherwise conveyed along a path to appear to fall under a substantially constant acceleration through the array of bumper pegs from a location near a top of the array of bumper pegs toward a bottom. The bottom of the array of bumper pegs can include a series of simulated video rendered slots or regions, in which the symbol arrays can eventually settle, to conclude the movement segment of the wagering game outcome portrayal. During at least some of the time while the symbol arrays fall through the bumper array, the individual symbol positions display dynamic content indicating a scrolling series of symbols passing through the symbol positions. The symbol arrays settle within one of the slots at the bottom of the array of bumper pegs and one or more, if any, of the symbol arrays is identified as being within an indicator region. The indicator region can be a fixed one of the slots at the bottom of the array of bumper pegs and a player can be encouraged to provide user inputs sufficient to convey the symbol array along a trajectory causing the symbol array to land within the indicator region. Some examples can incorporate modifications to the path of the symbol array during the chaotic tumble through the array of bumper pegs in accordance with the randomly determined outcome of the wagering game. Providing portrayals in accordance with the randomly determined outcome can also be achieved by controlling the final symbols that appear on symbol arrays, if any, landing in the indicator region.

In some instances, the paths (e.g., trajectories) of the symbol arrays can appear to be altered by features displayed on a primary display area of a gaming terminal (e.g., the primary display area 112 of the gaming terminal 110). For example, bumpers, chutes, slides, boundaries, walls, etc. can be provided on the video display to alter a direction, speed, and/or acceleration of symbol arrays traveling a path across the video display in the primary display area 112. In some instances, path-altering features can be provided in response to receiving wagers (individually or cumulatively over time), in response to activating a bonus round, in response to reaching a particular pay out milestone, in response to a community event, or in response to activation of another game feature.

Other aspects of the portrayal of a wagering game outcome can be activated and/or modified in response to events occurring within a wagering game base game and/or bonus game, such as modifications to the dimensions of the indicator region, changing the number of indicator regions appearing in the primary display area, the size of the symbol arrays, the number of pay lines, etc. In some instances, the dimensions of the indicator region, number of indicator regions, etc., can be modified (e.g., increased) in response to receiving an additional or supplemental wager from a player. For example, a player can be given an option to submit an additional wager to activate a second indicator region such that two symbol arrays will be evaluated. In the example, shown in FIG. 6, for example, a second indicator region can be situated above (or below) the indicator region 225 so as to encompass the symbol array 232 (or 236). Additionally or alternatively, an additional wager can increase the dimensions of the indicator region 225 such that the indicator region encompasses multiple of the symbol arrays, such as a region spanning the symbol array 232 and the symbol array 234, for example. By increasing the size and/or number of indicator regions, a player is effectively allowed to purchase additional reels (games) on the wheel 200, and thereby effectively play multiple symbol arrays simultaneously. During game play, such increases can also be activated in response to bonus events, community events, etc.

The modifications described herein (e.g., path-altering features, indicator region alterations, symbol array alterations, etc.) can be implemented simultaneously with a temporary alteration (e.g., increase) of an expected value of the wagering game, such as during a bonus round. Such modifications can correspond to a temporary increase in expected value to generate user excitement. For example, a temporary increase in expected value can be indicated by an increase in the dimensions of the indicator region such that a player perceives an increased chance of a winning symbol array landing within the indicator region. Additionally or alternatively, modifications can be implemented as complementary groups to maintain a substantially constant expected value of the wagering game, such as by adding a chute and/or bumper to direct symbol arrays toward an indicator region while simultaneously making the indicator region smaller and/or reducing a number of pay lines, etc. Player excitement, anticipation, and/or interest can thereby be generated without adjusting the expected value of the wagering game.

Each of these embodiments and obvious variations thereof is contemplated as falling within the spirit and scope of the claimed invention, which is set forth in the following claims.

What is claimed is:

1. A gaming system primarily dedicated to playing at least one casino wagering game, comprising:

a gaming cabinet for housing components associated with the casino wagering game;

at least one electronic input device coupled to the gaming cabinet, the electronic input device configured to receive a physical input from a player to initiate the casino wagering game and transform the input into an electronic data signal;

at least one electronic display device coupled to the gaming cabinet;

a random element generator configured to generate one or more random elements; and one or more controllers configured to receive an input to play the at least one casino wagering game in response to the electronic data signal from the at least one electronic input device;

determine an outcome of the casino wagering game based, at least in part, on the one or more random elements;

portray a plurality of separated symbol arrays in motion with respect to an indicator region, each of the plurality of symbol arrays having a plurality of symbol positions;

while portraying the movement of the plurality of symbol arrays, display, via the at least one electronic display device, dynamic content in the symbol positions of each of the plurality of symbol arrays, the dynamic content including a plurality of symbols for indicating an outcome of the respective symbol array; and stop the movement of at least one of the plurality of symbol arrays with respect to the indicator region such that the at least one of the plurality of symbol arrays is associated with the indicator region to indicate the outcome of the at least one casino wagering game.

2. The gaming system according to claim 1, wherein the at least one display device displays video content to render a rotatable wheel having an exterior cylindrical surface with the plurality of symbol arrays situated on the exterior cylindrical surface of the rotatable wheel, and the portraying the movement of the plurality of symbol arrays is carried out by rendering the rotatable wheel undergoing rotation.

3. The gaming system according to claim 1, wherein the dynamic content includes a series of symbols passing through the at least one of the plurality of symbol positions.

4. The gaming system according to claim 3, wherein a rate of symbols passing through the plurality of symbol positions is non-uniform.

5. The gaming system according to claim 1, wherein the portraying the movement of the plurality of symbol arrays is carried out by displaying the at least one symbol array as traveling along a predictable path, via the at least one display device.

6. The gaming system according to claim 5, wherein a rate of travel along the predictable path is non-uniform.

7. A computer-implemented method of operating a gaming system primarily dedicated to playing at least one casino wagering game, the gaming system including a gaming cabinet, a random element generator, one or more controllers, one or more electronic display devices, and an electronic input device, the electronic display device and the electronic input device being coupled to the gaming cabinet, the method comprising:

generating one or more random elements with the random element generator;

receiving, responsive to a physical input to the electronic input device, a wager input to initiate the at least one casino wagering game;

determining, by the one or more controllers, an outcome of the at least one casino wagering game based, at least in part, on the one or more random elements;

displaying, via the one or more display devices, dynamic content in a plurality of symbol positions of each of a plurality of separated symbol arrays, the dynamic content including a plurality of symbols that move through the plurality of symbol positions of the respective symbol array;

while displaying the dynamic content in the plurality of symbol positions of the respective symbol array, portraying the plurality of symbol arrays in motion with respect to an indicator region; and stopping the movement of one of the plurality of symbol arrays with respect to the indicator region to thereby indicate the outcome of the at least one casino wagering game.

8. The computer-implemented method of operating a gaming system according to claim 7, wherein the indicator region is a region having an area sufficient to indicate selection of a single one of the plurality of symbol arrays without overlapping additional ones of the plurality of symbol arrays, the indicated symbol array indicating the outcome of the wagering game.

9. The computer-implemented method of operating a gaming system according to claim 7, wherein the indicator region is a region of the display having an area sufficient to indicate selection of more than one of the plurality of symbol arrays, the indicated more than one symbol arrays indicating the outcome of the wagering game.

10. The computer-implemented method of operating a gaming system according to claim 7, wherein the portraying is carried out by displaying video of the plurality of symbol arrays in motion via the one or more display devices.

11. The computer-implemented method of operating a gaming system according to claim 10, wherein the indicator region is distinguished by a differential color or contrast between the indicator region and a region of the one or more display devices at least partially surrounding the indicator region.

12. The computer-implemented method of operating a gaming system according to claim 7, wherein the displaying dynamic content is carried out by providing video content on the one or more display devices to render a series of symbols passing through at least one of the plurality of symbol positions.

13. The computer-implemented method of operating a gaming system according to claim 12, wherein a rate of symbols passing through the at least one of the plurality of symbol positions is non-uniform.

14. The computer-implemented method of operating a gaming system according to claim 12, wherein the displaying dynamic content includes gradually slowing a rate of symbols passing through the at least one of the plurality of symbols positions until the displaying dynamic content is concluded.

15. The computer-implemented method of operating a gaming system according to claim 7, wherein the indicator region includes a fixed region of the one or more display devices, and wherein the portraying is carried out by displaying the plurality of symbol arrays as traveling at least partially toward the indicator region.

16. The computer-implemented method of operating a gaming system according to claim 7, wherein the portraying is carried out by displaying the indicator region as traveling relative to the plurality of symbol arrays.

17. The computer-implemented method of operating a gaming system according to claim 7, wherein the one or more display devices displays video content to render the plurality of symbol arrays are situated on an exterior cylindrical surface of a rotatable wheel, and wherein the portraying is carried out by rendering the rotatable wheel undergoing rotation so as to cause the plurality of symbol arrays to move with respect to the indicator region on the one or more display devices.

18. The computer-implemented method of operating a gaming system according to claim 7, further comprising receiving a user input to influence a path of movement of at least one of the plurality of symbol arrays, and wherein the portraying is carried out according to the user input.

19. The computer-implemented method of operating a gaming system according to claim 17, wherein the user input is received via a touch screen user interface, the user input including an indication of a user gesture, the method further comprising:

determining a trajectory of the at least one symbol array, wherein the trajectory is characterized at least in part by the indication of the user gesture, and wherein the portraying includes displaying the at least one symbol array moving according to the determined trajectory.

20. The computer-implemented method of operating a gaming system according to claim 7, further comprising:

displaying indications of path-influencing features via the one or more display devices, and wherein the portraying includes displaying at least one symbol array moving along a path determined at least in part according to the displayed indications of path-influencing features.

* * * * *